(12) United States Patent
Ahn

(10) Patent No.: US 11,575,898 B2
(45) Date of Patent: Feb. 7, 2023

(54) METHOD AND APPARATUS FOR CODING IMAGE USING ADAPTATION PARAMETER SET

(71) Applicant: DIGITALINSIGHTS INC., Seoul (KR)

(72) Inventor: Yong Jo Ahn, Seoul (KR)

(73) Assignee: DIGITALINSIGHTS INC., Seoul (KR)

(*) Notice: Subject to any disclaimer, the term of this patent is extended or adjusted under 35 U.S.C. 154(b) by 0 days.

(21) Appl. No.: 17/511,399

(22) Filed: Oct. 26, 2021

(65) Prior Publication Data
US 2022/0053190 A1  Feb. 17, 2022

Related U.S. Application Data

(63) Continuation of application No. 17/357,753, filed on Jun. 24, 2021, now Pat. No. 11,190,769, which is a
(Continued)

(30) Foreign Application Priority Data

May 24, 2019 (KR) .......................... 10-2019-0060975

(51) Int. Cl.
| | | |
|---|---|---|
| H04N 19/124 | (2014.01) | |
| H04N 19/176 | (2014.01) | |
| H04N 19/157 | (2014.01) | |
| H04N 19/30 | (2014.01) | |
| H04N 19/46 | (2014.01) | |

(52) U.S. Cl.
CPC ......... *H04N 19/124* (2014.11); *H04N 19/157* (2014.11); *H04N 19/176* (2014.11); *H04N 19/30* (2014.11); *H04N 19/46* (2014.11)

(58) Field of Classification Search
CPC .... H04N 19/176; H04N 19/70; H04N 19/124; H04N 19/117; H04N 19/463; H04N 19/82; H04N 19/46; H04N 19/13; H04N 19/91
See application file for complete search history.

(56) References Cited

U.S. PATENT DOCUMENTS

2013/0182755 A1*  7/2013  Chen ................. H04N 19/30
                                                       375/240.01
2021/0076028 A1*  3/2021  Heo .................. H04N 19/186

FOREIGN PATENT DOCUMENTS

JP  2013-034161 A  2/2013
JP  2015-518353 A  6/2015
(Continued)

OTHER PUBLICATIONS

International Search Report, Written Opinion, PCT/KR2020/006704 dated Aug. 21, 2020, 9 pgs.
(Continued)

*Primary Examiner* — Farhan Mahmud
(74) *Attorney, Agent, or Firm* — Morgan, Lewis & Bockius LLP

(57) ABSTRACT

A video decoding/decoding method and apparatus according to the present disclosure may obtain a transform coefficient of a current block, obtain an inverse-quantized transform coefficient by performing inverse-quantization on a transform coefficient based on a quantization-related parameter of an adaptation parameter set, and reconstruct a residual block of a current block based on an inverse-quantized transform coefficient.

10 Claims, 14 Drawing Sheets

| adaptation_parameter_set_rbsp() { | Descriptor |
|---|---|
| 301 — adaptation_parameter_set_id | u(5) |
| 302 — aps_params_type | u(3) |
| if( aps_params_type == ALF_APS) | |
| 303 —   alf_data( adaptation_parameter_set_id) | |
| else if( aps_params_type == LMCS_APS) | |
| 304 —   lmcs_data() | |
| aps_extension_flag | u(1) |
| if( aps_extension_flag ) | |
|   while( more_rbsp_data()) | |
|     aps_extension_data_flag | u(1) |
| rbsp_trailing_bits() | |
| } | |

Related U.S. Application Data continuation of application No. PCT/KR2020/006704, filed on May 22, 2020.

(56) References Cited

FOREIGN PATENT DOCUMENTS

| KR | 10-1418096 B1 | 7/2014 |
|---|---|---|
| KR | 10-2019-0033036 A | 3/2019 |
| KR | 10-2019-0033771 A | 4/2019 |

OTHER PUBLICATIONS

Ahn, Notice of Allowance, U.S. Appl. No. 17/357,753, dated Sep. 21, 2021, 8 pgs.

\* cited by examiner

| adaptation_parameter_set_rbsp() { | Descriptor |
|---|---|
|   adaptation_parameter_set_id | u(5) |
|   aps_params_type | u(3) |
|   if( aps_params_type = = ALF_APS) | |
|     alf_data( adaptation_parameter_set_id) | |
|   else if( aps_params_type = = LMCS_APS) | |
|     lmcs_data() | |
|   aps_extension_flag | u(1) |
|   if( aps_extension_flag ) | |
|     while( more_rbsp_data()) | |
|       aps_extension_data_flag | u(1) |
|   rbsp_trailing_bits() | |
| } | |

FIG. 3

```
scaling_list_data() {                                                                          Descriptor
    scaling_matrix_for_lfnst_disabled_flag                                                     u(1)
    scaling_list_chroma_present_flag                                                           u(1)
    for( id = 0; id < 28; id ++ )
        matrixSize = (id < 2 ) ? 2 : ( ( id < 8 ) ? 4 : 8 )
        if( scaling_list_chroma_present_flag || ( id % 3 == 2 ) || ( id == 27 ) ) {
            scaling_list_copy_mode_flag[ id ]                                                  u(1)
            if( !scaling_list_copy_mode_flag[ id ] )
                scaling_list_pred_mode_flag[ id ]                                              u(1)
            if( ( scaling_list_copy_mode_flag[ id ] || scaling_list_pred_mode_flag[ id ] ) &&
                id != 0 && id != 2 && id != 8 )
                scaling_list_pred_id_delta[ id ]                                               ue(v)
            if( !scaling_list_copy_mode_flag[ id ] ) {
                nextCoef = 0
                if( id > 13 ) {
                    scaling_list_dc_coef[ id - 14 ]                                            se(v)
                    nextCoef += scaling_list_dc_coef[ id - 14 ]
                }
                for( i = 0; i < matrixSize * matrixSize; i++ ) {
                    x = DiagScanOrder[ 3 ][ 3 ][ i ][ 0 ]
                    y = DiagScanOrder[ 3 ][ 3 ][ i ][ 1 ]
                    if( !( id > 25 && x >= 4 && y >= 4 ) ) {
                        scaling_list_delta_coef[ id ][ i ]                                     se(v)
                        nextCoef += scaling_list_delta_coef[ id ][ i ]
                    }
                    ScalingList[ id ][ i ] = nextCoef
                }
            }
        }
}
```

FIG. 4

| adaptation_parameter_set_rbsp() { | Descriptor |
|---|---|
|   adaptation_parameter_set_id | u(5) |
|   aps_params_type | u(3) |
|   if( aps_params_type = = ALF_APS) | |
|     alf_data( adaptation_parameter_set_id) | |
|   else if( aps_params_type = = LMCS_APS) | |
|     lmcs_data() | |
|   else if( aps_params_type = = WP_APS) | |
|     pred_weight_table() | |
|   aps_extension_flag | u(1) |
|   if( aps_extension_flag ) | |
|     while( more_rbsp_data()) | |
|       aps_extension_data_flag | u(1) |
|   rbsp_trailing_bits() | |
| } | |

FIG. 6

| adaptation_parameter_set_rbsp() { | Descriptor |
|---|---|
|   adaptation_parameter_set_id | u(5) |
|   aps_params_type | u(3) |
|   if( aps_params_type = = ALF_APS) | |
|     alf_data( adaptation_parameter_set_id) | |
|   else if( aps_params_type = = LMCS_APS) | |
|     lmcs_data() | |
|   else if( aps_params_type = = WP_APS) | |
|     pred_weight_table() | |
|   else if( aps_params_type = = WBP_APS) | |
|     bipred_weight_table() | |
|   aps_extension_flag | u(1) |
|   if( aps_extension_flag ) | |
|     while( more_rbsp_data()) | |
|       aps_extension_data_flag | u(1) |
|   rbsp_trailing_bits() | |
| } | |

300 (table), 301 adaptation_parameter_set_id, 302 aps_params_type, 303 alf_data, 304 lmcs_data, 700 pred_weight_table, 701 bipred_weight_table

FIG. 7

| adaptation_parameter_set_rbsp() { | Descriptor |
|---|---|
|   adaptation_parameter_set_id | u(5) |
|   aps_params_type | u(3) |
|   if( aps_params_type = = ALF_APS) | |
|     alf_data( adaptation_parameter_set_id) | |
|   else if( aps_params_type = = LMCS_APS) | |
|     lmcs_data() | |
|   else if( aps_params_type = = WP_APS) | |
|     pred_weight_table( aps_param_type ) | |
|   else if( aps_params_type = = WBP_APS) | |
|     pred_weight_table(aps_param_type) | |
|   aps_extension_flag | u(1) |
|   if( aps_extension_flag ) | |
|     while( more_rbsp_data()) | |
|       aps_extension_data_flag | u(1) |
|   rbsp_trailing_bits() | |
| } | |

FIG. 8

| | pred_weight_table(aps_param_type) { | Descriptor |
|---|---|---|
| 900 → | | |
| |   luma_log2_weight_denom | ue(v) |
| |   if( ChromaArrayType != 0) | |
| |     delta_chroma_log2_weight_denom | se(v) |
| 910 { |   for( i = 0; i < NumRefIdxActive[0]; i++ ) | |
| |     luma_weight_l0_flag[ i ] | u(1) |
| |   if( ChromaArrayType != 0) | |
| |     for( i = 0; i < NumRefIdxActive[0]; i++ ) | |
| |       chroma_weight_l0_flag[ i ] | u(1) |
| |   for( i = 0; i < NumRefIdxActive[0]; i++ ) { | |
| |     if( luma_weight_l0_flag[i] ) { | |
| |       delta_luma_weight_l0[ i ] | se(v) |
| |       luma_offset_l0[i] | se(v) |
| |     } | |
| |     if( chroma_weight_l0_flag[i] ) | |
| |       for( j = 0; j < 2; j++ ) { | |
| |         delta_chroma_weight_l0[ i ][ j ] | se(v) |
| |         delta_chroma_offset_l0[ i ][ j ] | se(v) |
| |       } | |
| |   } | |
| 901 → |   if( aps_param_type = = WBP_APS ) { | |
| 920 { |     for( i = 0; i < NumRefIdxActive[1]; i++ ) | |
| |       luma_weight_l1_flag[ i ] | u(1) |
| |     if( ChromaArrayType != 0) | |
| |       for( i = 0; i < NumRefIdxActive[1]; i++ ) | |
| |         chroma_weight_l1_flag[ i ] | u(1) |
| |     for( i = 0; i < NumRefIdxActive[1]; i++ ) { | |
| |       if( luma_weight_l1_flag[i] ) { | |
| |         delta_luma_weight_l1[ i ] | se(v) |
| |         luma_offset_l1[ i ] | se(v) |
| |       } | |
| |       if( chroma_weight_l1_flag[i] ) | |
| |         for( j = 0; j < 2; j++ ) { | |
| |           delta_chroma_weight_l1[ i ][ j ] | se(v) |
| |           delta_chroma_offset_l1[ i ][ j ] | se(v) |
| |         } | |
| |     } | |
| |   } | |
| | } | |

FIG. 9

| adaptation_parameter_set_rbsp() { | Descriptor |
|---|---|
|   adaptation_parameter_set_id | u(5) |
|   aps_params_type | u(3) |
|   if( aps_params_type == ALF_APS) | |
|     alf_data( adaptation_parameter_set_id) | |
|   else if( aps_params_type == LMCS_APS) | |
|     lmcs_data() | |
|   else if( aps_params_type == WP_APS) | |
|     pred_weight_table() | |
|   else if( aps_params_type == MTT_APS) | |
|     mtt_data() | |
|   aps_extension_flag | u(1) |
|   if( aps_extension_flag ) | |
|     while( more_rbsp_data()) | |
|       aps_extension_data_flag | u(1) |
|   rbsp_trailing_bits() | |
| } | |

FIG. 10

| mtt_data(aps_params_type) { | Descriptor |
|---|---|
|   slice_log2_diff_min_qt_min_cb_luma | ue(v) |
|   slice_max_mtt_hierarchy_depth_luma | ue(v) |
|   if( slice_max_mtt_hierarchy_depth_luma != 0 ) { | |
|     slice_log2_diff_max_bt_min_qt_luma | ue(v) |
|     slice_log2_diff_max_tt_min_qt_luma | ue(v) |
|   } | |
|   if( aps_params_type = = MTT_CST_APS ) { | |
|     slice_log2_diff_min_qt_min_cb_chroma | ue(v) |
|     slice_max_mtt_hierarchy_depth_chroma | ue(v) |
|     if( slice_max_mtt_hierarchy_depth_chroma != 0 ) { | |
|       slice_log2_diff_max_bt_min_qt_chroma | ue(v) |
|       slice_log2_diff_max_tt_min_qt_chroma | ue(v) |
|     } | |
|   } | |
| } | |

| mtt_data() { | Descriptor |
|---|---|
|   slice_log2_diff_min_qt_min_cb | ue(v) |
|   slice_max_mtt_hierarchy_depth | ue(v) |
|   if( slice_max_mtt_hierarchy_depth != 0 ) { | |
|     slice_log2_diff_max_bt_min_qt | ue(v) |
|     slice_log2_diff_max_tt_min_qt | ue(v) |
|   } | |
| } | |

FIG. 12

| slice_header() { | Descriptor |
|---|---|
| ... | |
|   if( partition_constraints_override_enabled_flag ) { | |
|     partition_constraints_override_flag | ue(v) |
|     if( partition_constraints_override_flag ) { | |
|       slce_mtt_aps_id | u(5) |
|       if( slice_type == I && qtbtt_dual_tree_intra_flag ) { | |
|         slice_mtt_chroma_aps_id | u(5) |
|       } | |
|     } | |
|   } | |
| ... | |
| } | |

(1300 → slce_mtt_aps_id; 1310 → slice_mtt_chroma_aps_id)

FIG. 13

METHOD AND APPARATUS FOR CODING IMAGE USING ADAPTATION PARAMETER SET

RELATED APPLICATIONS

This application is a continuation application of U.S. patent application Ser. No. 17/357,753, filed Jun. 24, 2021, which is a continuation application of PCT Application No. PCT/KR2020/006704, filed May 22, 2020, which claims the benefit of, and priority to, Korean Patent Application No. 10-2019-0060975, filed May 24, 2019, all of which are incorporated by reference herein in their entireties.

TECHNICAL FIELD

The present disclosure relates to a video encoding/decoding method and apparatus.

BACKGROUND ART

As a demand for high-resolution and high-definition video has recently increased, a need for a high-efficiency video compression technology for next-generation video services has emerged. Based on this need, ISO/IEC MPEG and ITU-T VCEG, which jointly standardized H.264/AVC and HEVC video compression standards, formed JVET (Joint Video Exploration Team) and conducted research and exploration to establish a new video compression standard from October 2015. In April 2018, a new video compression standardization was started with an evaluation of a responses to a new video compression standard CfP (Call for Proposal).

In a video compression technique, a block division structure means a unit that performs encoding and decoding, and a unit to which major encoding and decoding techniques such as prediction and transformation are applied. As video compression technology develops, the size of blocks for encoding and decoding is gradually increasing, and more various division types are supported as a block division type. In addition, video compression is performed using not only units for encoding and decoding, but also units subdivided according to the role of blocks.

In the HEVC standard, video encoding and decoding are performed using a unit block subdivided according to a quad-tree type block division structure and a role for prediction and transformation. In addition to the quad-tree type block division structure, various types of block division structures such as QTBT (Quad Tree plus Binary Tree) in the form of combining a quad-tree and a binary-tree, and MTT (Multi-Type Tree) in which a triple-tree is combined therewith have been proposed to improve video coding efficiency. Through the support of various block sizes and various types of block division structures, one picture is divided into multiple blocks, and information in units of coding units such as a coding mode, motion information, and intra prediction direction information corresponding to each block is expressed in various ways, so the number of bits expressing this is increasing significantly.

DISCLOSURE

Technical Problem

An object of the present disclosure is to improve coding efficiency of a video signal.

An object of the present disclosure is to provide a method and an apparatus for efficiently defining/managing various parameters to be applied in units of pictures or slices.

An object of the present disclosure is to provide a method and an apparatus for obtaining a scaling list for quantization/inverse-quantization.

Technical Solution

In order to solve the above problems, the present invention provides a video coding method and apparatus using an adaptation parameter set.

A video decoding method and apparatus according to the present disclosure may obtain a transform coefficient of a current block by decoding a bitstream, and obtain an inverse-quantized transform coefficient by performing inverse-quantization on the obtained transform coefficient based on a quantization-related parameter included in the bitstream, and reconstruct a residual block of the current block based on the inverse-quantized transform coefficient. Here, the quantization-related parameter may be obtained from an adaptation parameter set (APS) of the bitstream.

In the video decoding method and apparatus according to the present disclosure, the obtaining the inverse-quantized transform coefficient comprises: obtaining a scaling list for the inverse-quantization based on the quantization-related parameter, deriving a scaling factor based on the scaling list and a predetermined weight, and applying the derived scaling factor to the transform coefficient.

In the video decoding method and apparatus according to the present disclosure, the quantization-related parameter may include at least one of a copy mode flag, a prediction mode flag, a delta identifier, or differential coefficient information.

In the video decoding method and apparatus according to the present disclosure, the weight may be obtained from a weight candidate list pre-defined in the decoding apparatus.

In the video decoding method and apparatus according to the present disclosure, the number of weight candidate lists pre-defined in the decoding apparatus is two or more, and one of weight candidate lists may be selectively used based on an encoding parameter of the current block.

In the video decoding method and apparatus according to the present disclosure, the adaptation parameter set is a syntax structure including a parameter set to be used in a predetermined image unit, and the parameter set includes at least one of an adaptive loop filter (ALF)-related parameter, a mapping model-related parameter for a reshaper (luma mapping with chroma scaling), or the quantization-related parameter.

In the video decoding method and apparatus according to the present disclosure, the adaptation parameter set may further include at least one of an identifier for the adaptation parameter set or adaptation parameter set type information.

In the video decoding method and apparatus according to the present disclosure, the same identifier is allocated to different adaptation parameter set types, and the adaptation parameter sets may be managed using different lists for each adaptation parameter set type.

A video encoding method and apparatus according to the present disclosure may obtain a transform coefficient of a current block, perform inverse-quantization on the transform coefficient based on a predetermined quantization-related parameter to obtain an inverse-quantized transform coefficient, and reconstruct a residual block of the current block based on the inverse-quantized transform coefficient. Here, the quantization-related parameter may be transmitted in an adaptation parameter set (APS) of the bitstream.

A computer-readable recording medium storing a bitstream decoded by the video decoding method according to the present disclosure, the video decoding method comprising: decoding the bitstream to obtain a transform coefficient of a current block, obtaining an inverse-quantized transform coefficient by performing inverse-quantization on the obtained transform coefficient based on a quantization-related parameter included in the bitstream, and reconstructing a residual block of the current block based on the inverse-quantized transform coefficient. Here, the quantization-related parameter may be obtained from an adaptation parameter set (APS) of the bitstream.

Advantageous Effects

According to the present disclosure, it is possible to improve video signal coding efficiency by using an adaptation parameter set.

According to the present disclosure, various parameters for each adaptation parameter set type (APS type) can be effectively managed by using the adaptation parameter set.

According to the present disclosure, it is possible to efficiently obtain a scaling list for quantization/inverse-quantization through various modes.

DESCRIPTION OF DRAWINGS

FIG. 3 shows an embodiment of a syntax table of an adaptation parameter set (APS).

FIG. 4 shows an embodiment of a syntax table for transmission and parsing of a quantization-related parameter.

FIG. 6 is a diagram illustrating an embodiment of an APS syntax table to which an APS type for weight prediction is added.

FIG. 7 is a diagram illustrating another embodiment of an APS syntax table to which an APS type for weight prediction is added.

FIG. 8 is a diagram illustrating another embodiment of an APS syntax table to which an APS type for weight prediction is added.

FIG. 9 is a diagram illustrating an embodiment of a syntax table for transmission and parsing a parameter for weight prediction.

FIG. 10 is a diagram illustrating an embodiment of an APS syntax table to which an APS type for a block division structure is added.

FIGS. 11 and 12 show embodiments of a syntax table for parameters for a block structure additionally signaled or parsed when the current APS type is a parameter for a block division structure.

FIG. 13 is a diagram illustrating a part of a syntax table for a slice header in order to show an embodiment of APS signaling or parsing for a block division structure in the slice header.

BEST MODE FOR INVENTION

Figure 1:
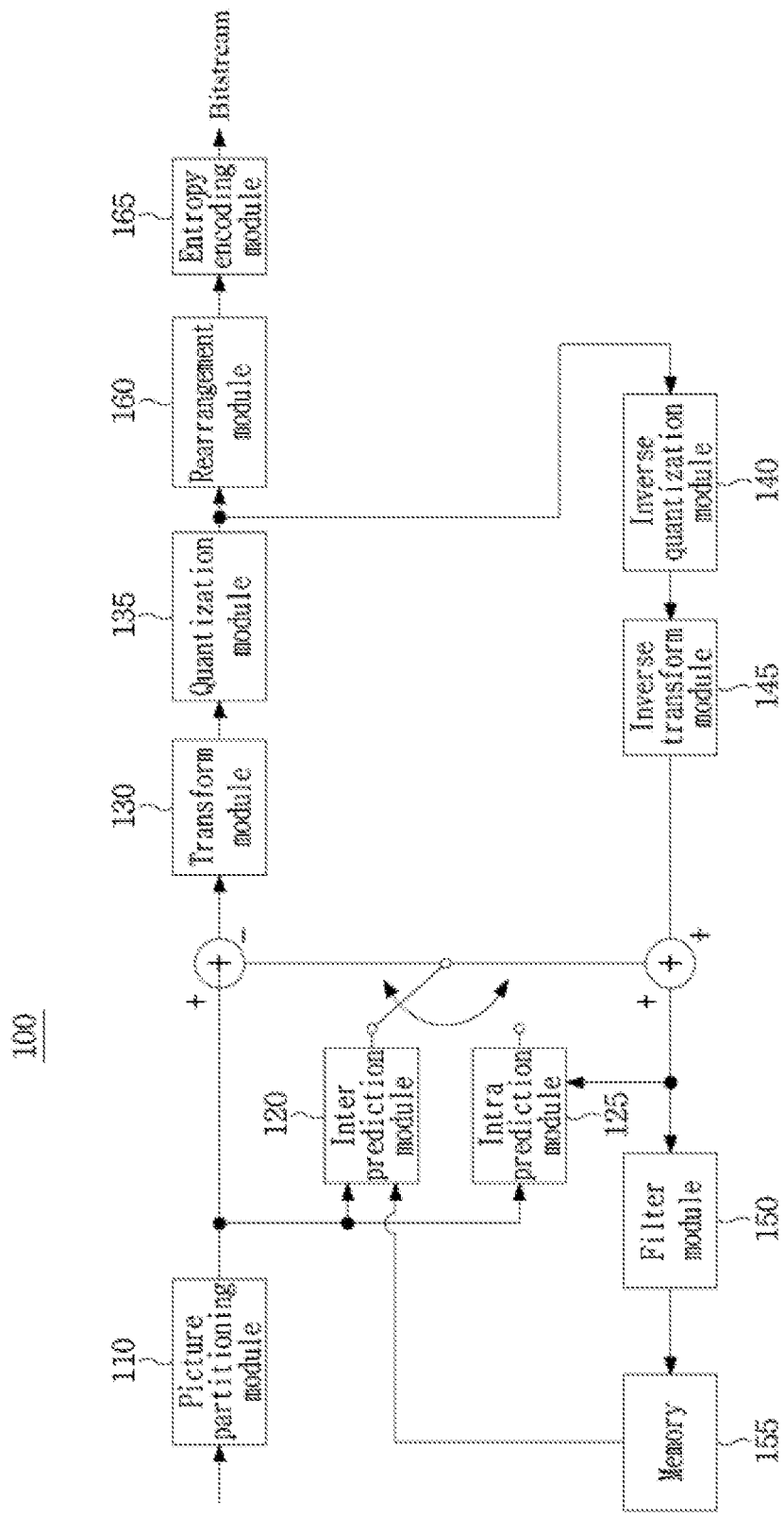
FIG. 1 is a block diagram showing an image encoding apparatus according to the present disclosure.

In order to solve the above problems, the present invention provides a video coding method and apparatus using an adaptation parameter set.

A video decoding method and apparatus according to the present disclosure may obtain a transform coefficient of a current block by decoding a bitstream, and obtain an inverse-quantized transform coefficient by performing inverse-quantization on the obtained transform coefficient based on a quantization-related parameter included in the bitstream, and reconstruct a residual block of the current block based on the inverse-quantized transform coefficient. Here, the quantization-related parameter may be obtained from an adaptation parameter set (APS) of the bitstream.

In the video decoding method and apparatus according to the present disclosure, the obtaining the inverse-quantized transform coefficient comprises: obtaining a scaling list for the inverse-quantization based on the quantization-related parameter, deriving a scaling factor based on the scaling list and a predetermined weight, and applying the derived scaling factor to the transform coefficient.

In the video decoding method and apparatus according to the present disclosure, the quantization-related parameter may include at least one of a copy mode flag, a prediction mode flag, a delta identifier, or differential coefficient information.

In the video decoding method and apparatus according to the present disclosure, the weight may be obtained from a weight candidate list pre-defined in the decoding apparatus.

In the video decoding method and apparatus according to the present disclosure, the number of weight candidate lists pre-defined in the decoding apparatus is two or more, and one of weight candidate lists may be selectively used based on an encoding parameter of the current block.

In the video decoding method and apparatus according to the present disclosure, the adaptation parameter set is a syntax structure including a parameter set to be used in a predetermined image unit, and the parameter set includes at least one of an adaptive loop filter (ALF)-related parameter, a mapping model-related parameter for a reshaper (luma mapping with chroma scaling), or the quantization-related parameter.

In the video decoding method and apparatus according to the present disclosure, the adaptation parameter set may further include at least one of an identifier for the adaptation parameter set or adaptation parameter set type information.

In the video decoding method and apparatus according to the present disclosure, the same identifier is allocated to different adaptation parameter set types, and the adaptation parameter sets may be managed using different lists for each adaptation parameter set type.

A video encoding method and apparatus according to the present disclosure may obtain a transform coefficient of a current block, perform inverse-quantization on the transform coefficient based on a predetermined quantization-related parameter to obtain an inverse-quantized transform coefficient, and reconstruct a residual block of the current block based on the inverse-quantized transform coefficient. Here, the quantization-related parameter may be transmitted in an adaptation parameter set (APS) of the bitstream.

A computer-readable recording medium storing a bitstream decoded by the video decoding method according to the present disclosure, the video decoding method comprising: decoding the bitstream to obtain a transform coefficient of a current block, obtaining an inverse-quantized transform coefficient by performing inverse-quantization on the obtained transform coefficient based on a quantization-related parameter included in the bitstream, and reconstructing a residual block of the current block based on the inverse-quantized transform coefficient. Here, the quantization-related parameter may be obtained from an adaptation parameter set (APS) of the bitstream.

MODE FOR INVENTION

Hereinafter, embodiments of the present disclosure will be described in detail with reference to the accompanying drawings in the present specification so that those of ordinary skill in the art may easily implement the present disclosure. However, the present disclosure may be implemented in various different forms and is not limited to the embodiments described herein. In the drawings, parts irrelevant to the description are omitted in order to clearly describe the present disclosure, and similar reference numerals are attached to similar parts throughout the specification.

Throughout this specification, when a certain part is said to be 'connected' with another part, this includes not only the case where it is directly connected, but also the case where it is electrically connected with another element in the middle. In addition, in the entire specification, when a certain part "includes" a certain component, it means that other components may be further included rather than excluding other components unless otherwise stated.

The terms 'step (to)~' or 'step of ~' as used throughout this specification does not mean 'step for ~'. In addition, terms such as first and second may be used to describe various elements, but the elements should not be limited to the terms. The above terms are used only for the purpose of distinguishing one component from another component.

In addition, the components shown in the embodiment of the present disclosure are shown independently to represent different characteristic functions, it does not mean that each component is made of separate hardware or a single software component unit. That is, each component unit is described by being listed as a respective component unit for convenience of description, and at least two of the component units are combined to form one component unit, or one component unit may be divided into a plurality of component units to perform a function. An integrated embodiment and a separate embodiment of each of these components are also included in the scope of the present disclosure as long as they do not depart from the essence of the present disclosure.

In the various embodiments of the present disclosure described herein below, terms such as "~unit", "~group", "~unit", "~module", and "~block" mean units that process at least one function or operation, and they may be implemented in hardware or software, or a combination of hardware and software.

In addition, a coding block refers to a processing unit of a set of target pixels on which encoding and decoding are currently performed, and may be used interchangeably as a coding block and a coding unit. In addition, the coding unit refers to a coding unit (CU) and may be generically referred to including a coding block (CB).

In addition, quad-tree division refers to that one block is divided into four independent coding units, and binary division refers to that one block is divided into two independent coding units. In addition, ternary division refers to that one block is divided into three independent coding units in a 1:2:1 ratio.

FIG. 1 is a block diagram showing an image encoding apparatus according to the present disclosure.

Referring to FIG. 1, a video encoding apparatus 100 may include: a picture dividing module 110, prediction modules 120 and 125, a transform module 130, a quantization module 135, a rearrangement module 160, an entropy encoding module 165, an inverse quantization module 140, an inverse transform module 145, a filter module 150, and a memory 155.

A picture dividing module 110 may divide an input picture into one or more processing units. Herein, the processing unit may be a prediction unit (PU), a transform unit (TU), or a coding unit (CU). Hereinafter, in an embodiment of the present disclosure, a coding unit may be used as a unit that performs encoding or a unit that performs decoding.

A prediction unit may be resulting from dividing one coding unit into at least one square or non-square of the same size, and it may be divided such that one prediction unit among prediction units divided within one coding unit has a different shape and/or size from another prediction unit. When it is not a minimum coding unit in generating a prediction unit which performs intra prediction based on a coding unit, intra prediction may be performed without dividing the coding unit into a plurality of prediction units N×N.

Prediction modules 120 and 125 may include an inter prediction module 120 performing inter prediction and an intra prediction module 125 performing intra prediction. Whether to perform inter prediction or intra prediction for a prediction unit may be determined, and detailed information (e.g., an intra prediction mode, a motion vector, a reference picture, etc.) according to each prediction method may be determined. A residual value (residual block) between a generated prediction block and an original block may be input to a transform module 130. In addition, prediction mode information, motion vector information, etc. used for prediction may be encoded together with a residual value by an entropy encoding module 165 and may be transmitted to a decoder. However, when a motion information derivation technique from the side of a decoder according to the present disclosure is applied, since an encoder does not generate prediction mode information and motion vector information, the corresponding information is not transmitted to the decoder. On the other hand, it is possible for an encoder to signal and transmit information indicating that motion information is derived and used from the side of a decoder and information on a technique used for inducing the motion information.

A inter prediction module 120 may predict a prediction unit based on information of at least one of a previous picture or a subsequent picture of a current picture, or may predict a prediction unit based on information of some encoded regions in the current picture, in some cases. As the inter prediction mode, various methods such as a merge mode, an advanced motion vector prediction (AMVP) mode, an affine mode, a current picture referencing mode, and a combined prediction mode may be used. In the merge mode, at least one motion vector among spatial/temporal merge candidates may be set as a motion vector of the current block, and inter prediction may be performed using the set motion vector. However, even in the merge mode, the preset motion vector may be corrected by adding an additional motion vector difference value (MVD) to the preset motion vector. In this case, the corrected motion vector may be used as the final motion vector of the current block, which will be described in detail with reference to FIG. 15. The affine mode is a method of dividing a current block into predetermined sub-block units and performing inter prediction using a motion vector derived for each sub-block unit. Here, the sub-block unit is represented by N×M, and N and M may be integers of 4, 8, 16 or more, respectively. The shape of the sub-block may be square or non-square. The sub-block unit may be a fixed one that is pre-promised to the encoding apparatus, or may be variably determined in consideration of the size/shape of the current block, the component type, and the like. The current picture referencing mode is an inter prediction method using a pre-reconstructed region in the current picture to which the current block belongs and a predetermined block vector, which will be described in detail with reference to FIGS. 9 to 14. In the combined prediction mode, a first prediction block through inter prediction and a second prediction block through intra prediction are respectively generated for one current block, and a predetermined weight is applied to the first and second prediction blocks to generate the final prediction block of the current block. Here, the inter prediction may be performed using any one of the above-described inter prediction modes. The intra prediction may be performed using only an intra prediction mode (e.g., any one of a planar mode, a DC mode, a vertical/horizontal mode, and a diagonal mode) preset in the encoding apparatus. Alternatively, the intra prediction mode for the intra prediction may be derived based on the intra prediction mode of a neighboring block (e.g., at least one of left, top, top-left, top-right, and bottom-right) adjacent to the current block. In this case, the number of neighboring blocks to be used may be fixed to one or two, or may be three or more. Even when all of the above-described neighboring blocks are available, only one of the left neighboring block or the top neighboring block may be limited to be used, or only the left and top neighboring blocks may be limited to be used. The weight may be determined in consideration of whether the aforementioned neighboring block is a block coded in an intra-mode. It is assumed that a weight w1 is applied to the first prediction block and a weight w2 is applied to the second prediction block. In this case, when both the left/top neighboring blocks are blocks coded in the intra mode, w1 may be a natural number less than w2. For example, a ratio of w1 and w2 may be [1:3]. When neither of the left/top neighboring blocks is a block coded in the intra mode, w1 may be a natural number greater than w2. For example, a ratio of w1 and w2 may be [3:1]. When only one of the left/top neighboring blocks is a block coded in the intra mode, w1 may be set to be the same as w2.

The inter prediction module 120 may include a reference picture interpolation module, a motion prediction module, and a motion compensation module.

A reference picture interpolation module may receive reference picture information from a memory 155 and may generate pixel information on an integer pixel or less than the integer pixel from the reference picture. In the case of luma pixels, an 8-tap DCT-based interpolation filter having different filter coefficients may be used to generate pixel information on an integer pixel or less than the integer pixel in a unit of a ¼ pixel. In the case of chroma signals, a 4-tap DCT-based interpolation filter having different filter coefficients may be used to generate pixel information on an integer pixel or less than the integer pixel in a unit of a ⅛ pixel.

A motion prediction module may perform motion prediction based on a reference picture interpolated by a reference picture interpolation module. As a method for obtaining a motion vector, various methods such as a full search-based block matching algorithm (FBMA), a three step search (TSS), and a new three-step search algorithm (NTS) may be used. A motion vector may have a motion vector value in a unit of a ½ pixel or a ¼ pixel based on an interpolated pixel. A motion prediction module may predict a current prediction unit by using various motion prediction methods.

An intra prediction module 125 may generate a prediction unit based on reference pixel information neighboring to a current block which is pixel information in the current picture. When a neighboring block of a current prediction unit is a block on which inter prediction has been performed and a reference pixel is a pixel on which inter prediction has been performed, a reference pixel included in a block on which inter prediction has been performed may be replaced with reference pixel information of a neighboring block on which intra prediction has been performed. In other words, when a reference pixel is not available, information on a reference pixel that is not available may be replaced with at least one reference pixel among available reference pixels.

In addition, a residual block including residual information that is a difference between a prediction unit on which prediction has been performed based on the prediction unit generated by prediction modules 120 and 125 and an original block of the prediction unit may be generated. The generated residual block may be input to a transform module 130.

A transform module 130 may transform a residual block including residual information between an original block and a prediction unit generated by prediction modules 120 and 125 using a transform method such as discrete cosine transform (DCT), discrete sine transform (DST), and KLT. Whether to apply DCT, DST, or KLT in order to transform a residual block may be determined based on intra prediction mode information of a prediction unit used to generate a residual block.

A quantization module 135 may quantize values transformed to a frequency domain by a transform module 130. Quantization coefficients may vary depending on a block or importance of a picture. The values calculated by a quantization module 135 may be provided to an inverse quantization module 140 and a rearrangement module 160.

A rearrangement module 160 may rearrange coefficient values on quantized residual values.

A rearrangement module 160 may change coefficients in the form of a two-dimensional block into coefficients in the form of a one-dimensional vector through a coefficient scanning method. For example, a rearrangement module 160 may scan from DC coefficients to coefficients in a high frequency domain using zig-zag scanning method so as to change the coefficients to be in the form of a one-dimensional vector. Depending on a size of a transform unit and an intra prediction mode, vertical scanning where coefficients in the form of a two-dimensional block are scanned in a column direction or horizontal scanning where coefficients in the form of a two-dimensional block are scanned in a row direction may be used instead of zig-zag scanning. In other words, which scanning method among zig-zag scanning, vertical scanning, and horizontal scanning is used may be determined depending on a size of a transform unit and an intra prediction mode.

An entropy encoding module 165 may perform entropy encoding based on values calculated by a rearrangement module 160. Entropy encoding may use various encoding methods such as Exponential Golomb, Context-Adaptive Variable Length Coding (CAVLC), and Context-Adaptive Binary Arithmetic Coding (CABAC). In relation to this, an entropy encoding module 165 may encode residual value coefficient information of a coding unit from a rearrangement module 160 and prediction modules 120 and 125. In addition, according to the present disclosure, information indicating that motion information is derived and used at a decoder side and information on a technique used to derive motion information may be signaled and transmitted.

An inverse quantization module 140 and an inverse transform module 145 may inversely quantize values quantized by a quantization module 135 and inversely transform values transformed by a transform module 130. A residual value generated by an inverse quantization module 140 and an inverse transform module 145 may be combined with a prediction unit predicted through a motion prediction module, motion compensation module, and intra prediction module included in prediction modules 120 and 125 to generate a reconstructed block.

A filter module 150 may include at least one of a deblocking filter, an offset correction module, or an adaptive loop filter (ALF). A deblocking filter may remove block distortion that occurs due to boundaries between blocks in a reconstructed picture. An offset correction module may correct offset with respect to an original image in a unit of a pixel in a deblocking filtered image. In order to perform offset correction on a particular picture, a method of applying offset in consideration of edge information of each pixel or a method of partitioning pixels included in an image into the predetermined number of regions, determining a region to be subjected to perform offset, and applying the offset to the determined region may be used. Adaptive loop filtering (ALF) may be performed based on a value obtained by comparing a filtered reconstructed image and an original image. After partitioning pixels included in an image into predetermined groups, one filter to be applied to the corresponding group may be determined, and filtering may be performed differentially for each group.

A memory 155 may store a reconstructed block or picture calculated through a filter module 150. The stored reconstructed block or picture may be provided to prediction modules 120 and 125 in performing inter prediction.

Figure 2:
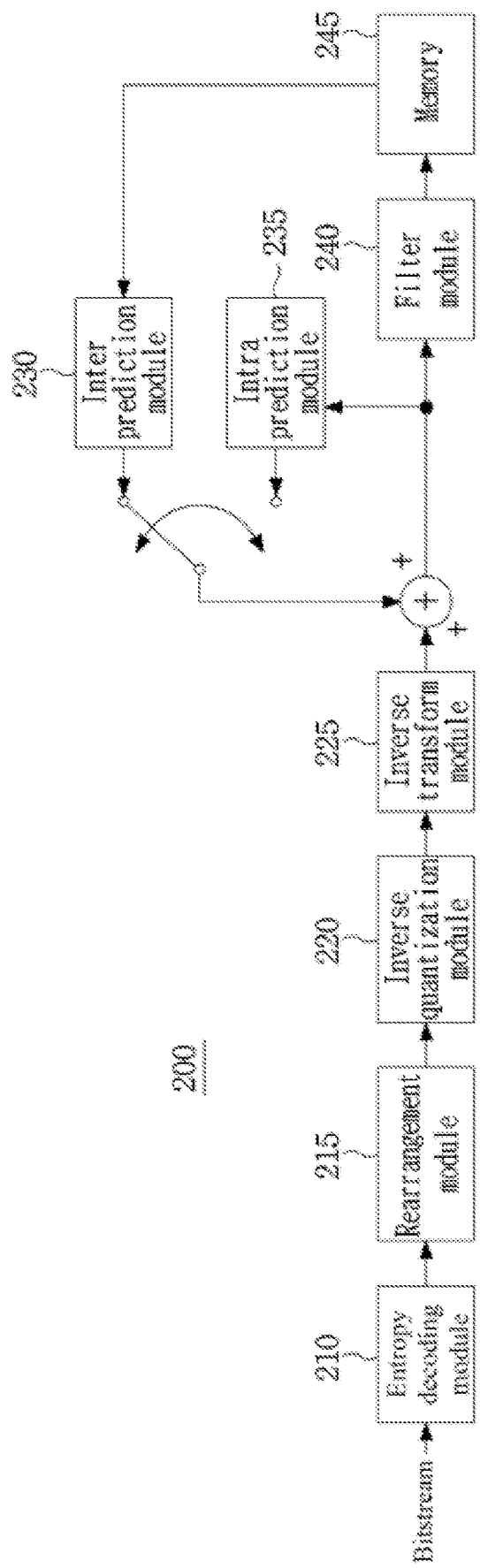
FIG. 2 is a block diagram showing an image decoding apparatus according to the present disclosure.

FIG. 2 is a block diagram showing an image decoding apparatus according to the present disclosure.

Referring to FIG. 2, an apparatus 200 for decoding a video may include: an entropy decoding module 210, a rearrangement module 215, an inverse quantization module 220, an inverse transform module 225, prediction modules 230 and 235, a filter module 240, and a memory 245.

When a video bitstream is input to an apparatus for decoding a video, the input bitstream may be decoded according to an inverse process of an apparatus for encoding a video.

An entropy decoding module 210 may perform entropy decoding according to an inverse process of entropy encoding by an entropy encoding module of a video encoding apparatus. For example, corresponding to methods performed by a video encoding apparatus, various methods such as Exponential Golomb, Context-Adaptive Variable Length Coding (CAVLC), and Context-Adaptive Binary Arithmetic Coding (CABAC) may be applied.

An entropy decoding module 210 may decode information on intra prediction and inter prediction performed by an encoding apparatus.

A rearrangement module 215 may perform rearrangement on a bitstream entropy decoded by an entropy decoding module 210 based on a rearrangement method used in an encoding apparatus. A rearrangement module may reconstruct and rearrange coefficients in the form of a one-dimensional vector to coefficients in the form of a two-dimensional block.

An inverse quantization module 220 may perform inverse quantization based on a quantization parameter received from an encoding apparatus and rearranged coefficients of a block.

An inverse transform module 225 may perform inverse transform, i.e., inverse DCT, inverse DST, and inverse KLT, which corresponds to a transform, i.e., DCT, DST, and KLT, performed by a transform module, on a quantization result by an apparatus for encoding a video. Inverse transform may be performed based on a transmission unit determined by a video encoding apparatus. In an inverse transform module 225 of a video decoding apparatus, transform schemes (e.g., DCT, DST, and KLT) may be selectively performed depending on multiple pieces of information such as a prediction method, a size of a current block, and a prediction direction.

Prediction modules 230 and 235 may generate a prediction block based on information on prediction block generation received from an entropy decoding module 210 and information on a previously decoded block or picture received from a memory 245.

As described above, if a size of a prediction unit and a size of a transform unit are the same when intra prediction is performed in the same manner as an operation of a video encoding apparatus, intra prediction may be performed on a prediction unit based on pixels existing on the left, upper left, and top of a prediction unit. However, if the size of the prediction unit and the size of the transform unit are different when the intra prediction is performed, intra prediction may be performed using a reference pixel based on a transform unit. In addition, intra prediction using N×N division may be used only for the minimum coding unit.

Prediction modules 230 and 235 may include a prediction unit determination module, an inter prediction module, and an intra prediction module. A prediction unit determination module may receive a variety of information, such as prediction unit information, prediction mode information of an intra prediction method, and information on motion prediction of an inter prediction method, from an entropy decoding module 210, may divide a current coding unit into prediction units, and may determine whether inter prediction or intra prediction is performed on the prediction unit. On the other hand, if an encoder 100 does not transmit information related to motion prediction for inter prediction, but transmit information indicating that motion information is derived and used from the side of a decoder and information about a technique used for deriving motion information, the prediction unit determination module determines prediction performance of an inter prediction module 230 based on the information transmitted from the encoder 100.

An inter prediction module 230 may perform inter prediction on a current prediction unit based on information of at least one of a previous picture or a subsequent picture of the current picture including the current prediction unit using information required for inter prediction of the current prediction unit provided by a video encoding apparatus. In order to perform inter prediction, an inter prediction mode of a prediction unit included in a corresponding coding unit may be determined based on the coding unit. With respect to the inter prediction mode, the aforementioned merge mode, AMVP mode, affine mode, current picture referencing mode, combined prediction mode, etc. may be equally used in the decoding apparatus, and a detailed description thereof will be omitted herein. The inter prediction module 230 may determine the inter prediction mode of the current prediction unit with a predetermined priority, which will be described with reference to FIGS. 16 to 18.

An intra prediction module 235 may generate a prediction block based on pixel information in a current picture. When a prediction unit is a prediction unit subjected to intra prediction, intra prediction may be performed based on intra prediction mode information of the prediction unit received from a video encoding apparatus. An intra prediction module 235 may include an adaptive intra smoothing (AIS) filter, a reference pixel interpolation module, and a DC filter. An AIS filter performs filtering on a reference pixel of a current block, and whether to apply the filter may be determined depending on a prediction mode of a current prediction unit. AIS filtering may be performed on a reference pixel of a current block by using a prediction mode of a prediction unit and AIS filter information received from an apparatus for encoding a video. When a prediction mode of a current block is a mode where AIS filtering is not performed, an AIS filter may not be applied.

When a prediction mode of a prediction unit is a prediction unit that performs intra prediction based on a pixel value interpolated by a reference pixel, a reference pixel interpolation module may interpolate a reference pixel to generate a reference pixel in a unit of pixel equal to an integer pixel or less than the integer pixel. When a prediction mode of a current prediction unit is a prediction mode in which a prediction block is generated without interpolating a reference pixel, a reference pixel may not be interpolated. A DC filter may generate a prediction block through filtering when a prediction mode of a current block is a DC mode.

A reconstructed block or picture may be provided to a filter module 240. A filter module 240 may include a deblocking filter, an offset correction module, and an ALF.

A deblocking filter of a video decoding apparatus may receive information on a deblocking filter from a video encoding apparatus, and may perform deblocking filtering on a corresponding block.

An offset correction module may perform offset correction on a reconstructed image based on a type of offset correction and offset value information applied to an image in performing encoding. An ALF may be applied to a coding unit based on information on whether to apply the ALF, ALF coefficient information, etc. received from an encoding apparatus. The ALF information may be provided as being included in a particular parameter set.

A memory 245 may store a reconstructed picture or block for use as a reference picture or block, and may provide a reconstructed picture to an output module.

The present disclosure relates to a method and apparatus for signaling various parameters applicable to each picture or slice, such as an adaptive loop filter, a reshaper, quantization (scaling), and weighted prediction among video coding techniques, in one parameter set.

Also, the present invention relates to a method and apparatus for managing the parameter set in a list form in a video decoder.

A parameter to be applied in a predetermined image unit may be transmitted using one parameter set pre-defined in the encoding/decoding apparatus. The image unit may be at least one of a video sequence, a picture, a slice, a tile, or a brick. For example, parameters applicable to each picture or slice, such as an adaptive loop filter and a reshaper, may be transmitted using one predefined parameter set. In this case, one parameter set is used, but an additional signaling method for the type of the parameter set may be used. Since different types are signaled using the one parameter set, a parameter set identifier (ID) or a parameter set management list may be shared even if the types of parameter sets are different. In the present disclosure, in transmitting various types of parameters using the same parameter set, a method and an apparatus for sharing a parameter set identifier and a list or independently managing them are proposed.

FIG. 3 shows an embodiment of a syntax table of an adaptation parameter set (APS).

The adaptation parameter set integrally defines/manages parameters for each APS type and is a parameter set for using/managing parameters by signaling only the identifier (ID) of the parameter set used in the corresponding image unit in the header of the corresponding image unit. That is, by using the adaptation parameter set, it may be omitted to define various parameters applied to the above-described predetermined image unit (e.g., one or more pictures, one or more slices) as separate parameter sets and signal them in units of images.

For example, various parameters applied to the one or more pictures or one or more slices include a filter parameter for an adaptive loop filter (ALF), a mapping model-related parameter for a reshaper (LMCS: luma mapping with chroma scaling), etc.

In addition, a weight-related parameter for weighted prediction and a parameter for block structure may also be included. Alternatively, a picture (or slice, tile, etc.) division-related parameter, a parameter related to a reference picture set or reference structure, a quantization-related parameter, a transform-related parameter, other in-loop filter-related parameter, etc. may also be included. A quantization-related parameter and an APS type therefor, a weight-related parameter and an APS type therefor, a parameter for a block structure and an APS type therefor, etc. will be described later in detail in the present disclosure.

As shown in FIG. 3, according to an embodiment of the adaptation parameter set syntax table, adaptation_parameter_set_id 301, which is an identifier for the adaptation parameter set, may be signaled.

The signaling of the adaptation parameter set identifier 301 may mean assigning a unique specific value (number) to each of one or more adaptation parameter sets transmitted through one video stream. The adaptation parameter set identifier 301 may mean information for specifying any one of a plurality of adaptation parameter sets pre-defined in the encoding/decoding apparatus.

In this case, the adaptation parameter set identifier may be expressed as a value from 0 to 2N−1, and may be transmitted using bits having a fixed length of N bits. In this case, according to an embodiment of the present disclosure, N may be one of 2, 3, 4, 5, and 6. In the syntax table shown in FIG. 3, an embodiment where N is 3 is shown.

The adaptation parameter set identifier 301 may use a single numeric string despite being of different adaptation parameter set types without dependence from the adaptation parameter set type 302 to be described later.

Alternatively, in the case of different adaptation parameter set types, a separate numeric string may be used for each adaptation parameter set type. That is, the adaptation parameter set identifier 301 may be defined with dependence on the adaptation parameter set type 302.

In an embodiment, when the adaptation parameter set identifier 301 dependent on the adaptation parameter set type 302 is used, the adaptation parameter set identifier 301 for the ALF adaptation parameter set type may have any one value of 0 to 7. The adaptation parameter set identifier 301 for the LMCS adaptation parameter set type may have any one of 0 to 3. The adaptation parameter set identifier 301 for the quantization adaptation parameter set type may have any one of 0 to 7. In this case, parameter sets having different adaptation parameter set types 302 may use the same value. In an embodiment, the same value may be used for the adaptation parameter set identifier for the ALF (ALF_APS_ID) and the adaptation parameter set identifier for the LMCS (LMCS_APS_ID). Similarly, the same value may be used for the adaptation parameter set identifier for ALF (ALF_APS_ID) and the adaptation parameter set identifier for quantization (SCALING_APS_ID).

As shown in FIG. 3, according to an embodiment of the APS syntax table, aps_params_type 302, which is information on the APS type that specifies the type of parameter included in the corresponding APS, may be signaled.

As the APS type, an ALF APS type indicating a parameter for an ALF, an LMCS APS type indicating a parameter for an LMCS, and the like may be defined. As described above, a SCALING APS type indicating a quantization-related parameter may be additionally defined.

According to an embodiment of the present disclosure, parameters included in the corresponding APS may be different depending on the APS type, and an additional parameter related syntax parsing process for the corresponding APS type may be performed according to the APS type.

As shown in FIG. 3, when the current APS type is ALF_APS, the ALF-related parameter may be parsed by calling alf_data( ) 303, and when the current APS type is LMCS_APS, lmcs_data( ) 304 may be called to parse the LMCS-related parameter. If the current APS type is SCALING_APS, the quantization-related parameter may be parsed by calling scaling_list_data( ).

Specifically, when the current APS type is ALF_APS, the ALF-related parameter may be extracted by calling the alf_data( ) function. The parameter extraction may be performed based on the above-described identifier 301. To this end, in the alf_data( ) function, the ALF-related parameter may be defined for each identifier 310, and the ALF-related parameter corresponding to the corresponding identifier 310 may be extracted. Alternatively, the parameter extraction may be performed without dependence on the identifier 301 described above. Similarly, when the current APS type is LMCS_APS, the LMCS-related parameter may be extracted by calling the lmcs_data( ) function. In the lmcs_data( ) function, the LMCS-related parameter may be defined for each identifier 310. In this case, the LMCS-related parameter corresponding to the identifier 301 may be extracted. Alternatively, the parameter extraction may be performed without dependence on the above-described identifier 301. If the current APS type is SCALING_APS, the quantization-related parameter may be extracted by calling the scaling_list_data( ) function. In the scaling_list_data( ) function, the quantization-related parameter may be defined for each identifier 310. In this case, the quantization-related parameter corresponding to the identifier 301 may be extracted. Alternatively, the parameter extraction may be performed without dependence on the above-described identifier 301.

In addition, at least one of the ALF-related parameter, the LMCS-related parameter, or the quantization-related parameter may be extracted with dependence on the identifier 301, and the rest may be extracted without dependence on the identifier 301. However, the present disclosure is not limited thereto, and all of the ALF, LMCS, and quantization-related parameters may be extracted with dependence on the identifier 301, or all may be extracted without dependence on the identifier 301.

Whether it depends on the identifier 301 may be selectively determined according to the APS type. The selection may be pre-promised to the encoding/decoding apparatus, or may be determined based on the value of the identifier 301 or whether it is activated. This may be equally/similarly applicable to various APS types to be described later.

In addition to this, an APS type for weighted prediction, a block structure, and the like may be defined. An embodiment of an APS syntax table in which APS types for weight prediction and block structure are defined will be described later in detail.

FIG. 4 shows an embodiment of a syntax table for transmission and parsing of a quantization-related parameter.

Referring to FIG. 4, a copy mode flag (scaling_list_copy_mode_flag) may be signaled. The copy mode flag may indicate whether a scaling list is obtained based on a copy mode. For example, when the copy mode flag is a first value, the copy mode may be used, otherwise, the copy mode may not be used. The copy mode flag may be parsed based on the identifier (id). Here, the identifier (id) is information derived based on the encoding parameter of the current block, which will be described later in detail with reference to FIG. 5.

Referring to FIG. 4, a prediction mode flag (scaling_list_pred_mode_flag) may be signaled. The prediction mode flag may indicate whether the scaling list is obtained based on a prediction mode. For example, when the prediction mode flag is a first value, the prediction mode may be used, otherwise, the prediction mode may not be used. The prediction mode flag may be parsed based on the copy mode flag. That is, it can be parsed only when the copy mode is not used according to the copy mode flag.

Referring to FIG. 4, a delta identifier (scaling_list_pred_id_delta) may be signaled. The delta identifier may be information for specifying a reference scaling list to be used to obtain the scaling list. The delta identifier may be signaled only when the copy mode is used according to the aforementioned copy mode flag or the prediction mode is used according to the prediction mode flag. Additionally, the delta identifier is signaled by further considering the above-described identifier (id), for example, as shown in FIG. 4, it may be signaled only when the identifier (id) does not correspond to a value (0, 2, 8) pre-defined in the decoding apparatus. In other words, the delta identifier may not be signaled when the maximum value of the width and height of the current block are 4 or 8, the component type of the current block is the luminance component, and the prediction mode of the current block is the intra mode.

Referring to FIG. 4, differential coefficient information (scaling_list_delta_coef) may be signaled. The differential coefficient information may refer to information encoded to specify a difference between a current coefficient and a previous coefficient of the scaling list. The differential coefficient information may be signaled only when the copy mode is not used according to the copy mode flag. That is, the differential coefficient information may be used in a prediction mode and a transmission mode, which will be described later.

Figure 5:
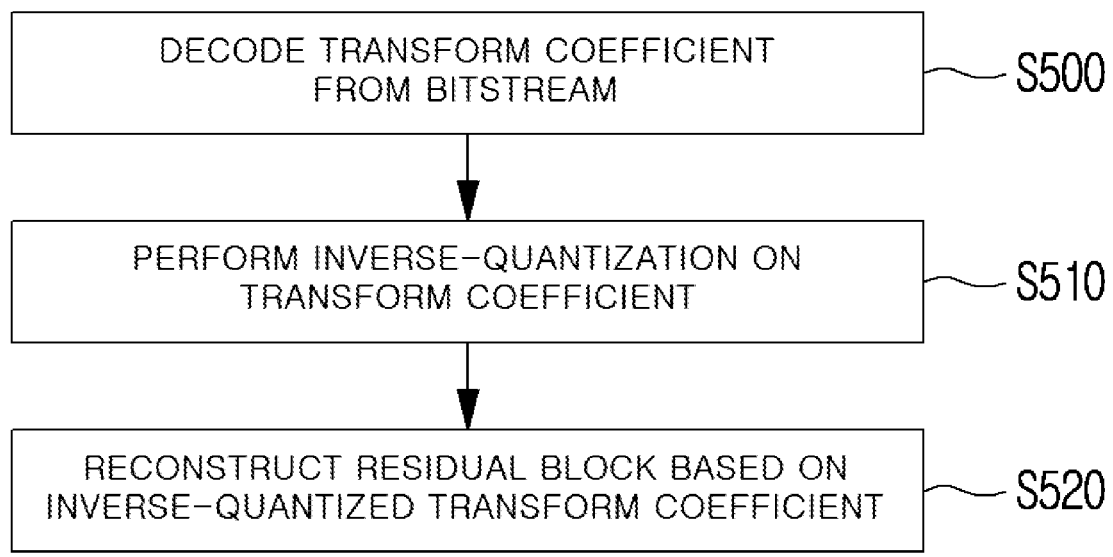
FIG. 5 shows an embodiment of a method for reconstructing a residual block based on a quantization-related parameter.

FIG. 5 shows an embodiment of a method for reconstructing a residual block based on a quantization-related parameter.

Referring to FIG. 5, a bitstream may be decoded to obtain a transform coefficient of the current block (S500).

Here, the transform coefficient may mean a coefficient obtained by performing transform and quantization on the residual sample in the encoding apparatus. Alternatively, the transform coefficient may mean a coefficient obtained by skipping a transform on the residual sample and performing only quantization. A transform coefficient may be variously expressed as a coefficient, a residual coefficient, a transform coefficient level, and the like.

Referring to FIG. 5, inverse-quantization may be performed on the obtained transform coefficient to obtain an inverse-quantized transform coefficient (S510).

Specifically, the inverse-quantized transform coefficient may be derived by applying a predetermined scaling factor (hereinafter, referred to as a final scaling factor) to the transform coefficient. Here, the final scaling factor may be derived by applying a predetermined weight to the initial scaling factor.

The initial scaling factor may be determined based on a scaling list corresponding to an identifier (hereinafter, referred to as a first identifier) of the current block. The decoding apparatus may derive the first identifier based on the encoding parameter of the current block. The encoding parameter may include at least one of a prediction mode, a component type, a size, a shape, a transform type, or whether to skip transform. The size of the current block may be expressed as width, height, sum of width and height, product of width and height, or a maximum/minimum value of width and height. For example, the first identifier may be derived as shown in Table 1.

TABLE 1

| max(nTbW, nTbH) | | 2 | 4 | 8 | 16 | 32 | 64 |
|---|---|---|---|---|---|---|---|
| predMode = MODE_INTRA | cIdx = 0 (Y) | — | 2 | 8 | 14 | 20 | 26 |
| | cIdx = 1 (Cb) | — | 3 | 9 | 15 | 21 | 21 |
| | cIdx = 2 (Cr) | — | 4 | 10 | 16 | 22 | 22 |
| predMode = MODE_INTER | cIdx = 0 (Y) | — | 5 | 11 | 17 | 23 | 27 |
| | cIdx = 1 (Cb) | 0 | 6 | 12 | 18 | 24 | 24 |
| | cIdx = 2 (Cr) | 1 | 7 | 13 | 19 | 25 | 25 |

Referring to Table 1, the first identifier may have any one of 0 to 27. The first identifier may be adaptively derived according to a maximum value among a width (nTbW) and a height (nTbH) of the current block, a prediction mode (predMode), and a component type (cIdx).

The scaling list according to the present disclosure has the form of an M×N matrix, and M and N may be the same or different. Each component of the matrix may be called as a coefficient or a matrix coefficient. The size of the matrix may be variably determined based on the first identifier of the current block. Specifically, when the first identifier is less than a first threshold size, at least one of M and N may be determined to be 2, and when the first identifier is greater than or equal to the first threshold size and less than a second threshold size, at least one of M and N may be determined to be 4. When the first identifier is greater than the second threshold size, at least one of M and N may be determined to be 8. Here, the first threshold size may be an integer of 2, 3, 4, 5 or more, and the second threshold size may be an integer of 8, 9, 10, 11 or more.

A scaling list for inverse-quantization of the current block may be derived based on a quantization-related parameter. As shown in FIG. 4, the quantization-related parameter may include at least one of a copy mode flag, a prediction mode flag, a delta identifier, or differential coefficient information.

The quantization-related parameter may be signaled in an adaptation parameter set (APS). The adaptation parameter set may mean a syntax structure including parameters to be applied to a picture and/or a slice.

For example, one adaptation parameter set may be signaled through a bitstream, and a plurality of adaptation parameter sets may be signaled through the bitstream. Here, the plurality of adaptation parameter sets may be identified by the adaptation parameter set identifier 301. Each adaptation parameter set may have a different adaptation parameter set identifier 301.

The quantization-related parameter for the scaling list of the current block may be signaled from an adaptation parameter set specified by a predetermined identifier (hereinafter referred to as a second identifier) among a plurality of adaptation parameter sets. The second identifier is information encoded to specify any one of a plurality of adaptation parameter sets, and may be signaled in a predetermined image unit (picture, slice, tile, or block). The second identifier is signaled in the header of the corresponding image unit, and the corresponding image unit may obtain a scaling list using a quantization-related parameter extracted from an adaptation parameter set corresponding to the second identifier. Hereinafter, a method of obtaining a scaling list based on a quantization-related parameter will be described.

1. In Case of Copy Mode

In the copy mode, the scaling list of the current block may be set to be the same as the scaling list (i.e., the reference scaling list) corresponding to the reference identifier. Here, the reference identifier may be derived based on the first identifier of the current block and a predetermined delta identifier. The delta identifier may be information encoded and signaled by the encoding apparatus to identify the reference scaling list. For example, the reference identifier may be set as a difference value between the first identifier of the current block and the delta identifier.

However, when the derived reference identifier is the same as the first identifier (i.e., the value of the delta identifier is 0), the scaling list of the current block may be set to be the same as the default scaling list. The default scaling list is pre-defined in the decoding apparatus, and each coefficient of the default scaling list may have a predetermined constant value (e.g., 2, 4, 8, 16).

The copy mode may be used based on a copy mode flag indicating whether the copy mode is used. For example, if the copy mode flag is a first value, the copy mode may be used, otherwise, the copy mode may not be used.

2. In Case of Prediction Mode

In the case of the prediction mode, the scaling list of the current block may be determined based on the prediction scaling list and the differential scaling list. Here, the prediction scaling list may be derived based on the aforementioned reference scaling list. That is, the reference scaling list specified by the first identifier of the current block and the delta identifier may be set as the prediction scaling list. However, as described above, when the derived reference identifier is the same as the first identifier (i.e., the value of the delta identifier is 0), the prediction scaling list may be determined based on the default scaling list.

The differential scaling list also has the form of an M×N matrix, and each coefficient of the matrix may be derived based on differential coefficient information signaled from a bitstream. For example, differential coefficient information that is a difference between the previous coefficient and the current coefficient may be signaled, and the current coefficient may be obtained using the signaled differential coefficient information and the previous coefficient. Through the above-described process, at least one coefficient of the differential scaling list may be restored. The scaling list of the current block may be determined by adding the prediction scaling list and the differential scaling list.

However, the prediction mode may be used based on a prediction mode flag indicating whether the prediction mode is used. For example, if the prediction mode flag is a first value, the prediction mode may be used, otherwise, the prediction mode may not be used.

3. In Case of Transmission Mode

At least one coefficient in the scaling list of the current block may be derived based on differential coefficient information signaled by the encoding apparatus. Here, the signaled differential coefficient information may be used to determine a differential coefficient that is a difference between a previous coefficient and a current coefficient. That is, the current coefficient of the scaling list may be derived using signaled differential coefficient information and the previous coefficient, and the scaling list of the current block may be obtained through this process.

Additionally, a predetermined offset may be applied to at least one coefficient belonging to the obtained scaling list. Here, the offset may be a fixed constant value (e.g., 2, 4, 8, 16) pre-promised to the decoding apparatus. For example, by adding the offset to at least one coefficient of the pre-obtained scaling list, a final scaling list for inverse-quantization may be obtained.

However, the transmission mode may be used only when the aforementioned copy mode and prediction mode are not used according to the copy mode flag and the prediction mode flag.

Meanwhile, the aforementioned weight may be obtained from a weight candidate list pre-defined in the decoding apparatus. The weight candidate list may include one or more weight candidates. Any one of the weight candidates belonging to the weight candidate list may be set as the weight.

For example, the weight candidate list may consist of six weight candidates. The weight candidate list may be defined as {40, 45, 51, 57, 64, 72} or {57, 64, 72, 80, 90, 102}. However, the present disclosure is not limited thereto, and the number of weight candidates may be 2, 3, 4, 5, 7, or more. Alternatively, the weight candidate list may include a weight candidate of a value less than 40 or a weight candidate of a value greater than 102.

The number of pre-defined weight candidate lists may be one, or two or more. When a plurality of weight candidate lists are defined, any one weight candidate list may be selectively used. In this case, the selection may be performed in consideration of the encoding parameters of the current block. The encoding parameters are the same as described above, and redundant descriptions will be omitted.

For example, it is assumed that the pre-defined weight candidate lists include {40, 45, 51, 57, 64, 72} (hereinafter referred to as a first list) and {57, 64, 72, 80, 90, 102} (hereinafter, referred to as a second list). If the current block is a block coded by a transform skip, the first list may be used, otherwise, the second list may be used. Alternatively, if the shape of the current block is a square, the first list may be used, otherwise, the second list may be used. Alternatively, if the current block is a block coded by a transform skip, the first list is used. Otherwise, as described above, the first list or the second list may be selectively used according to the shape of the current block.

Referring to FIG. 5, the residual block of the current block may be reconstructed based on the inverse-quantized transform coefficient (S520).

When the transform skip is not applied, the residual block may be reconstructed by performing inverse-transform on the inverse-quantized transform coefficients. On the other hand, when the transform skip is applied, the residual block may be reconstructed by setting the inverse-quantized transform coefficient as the residual sample.

The above-described reconstruction process of the residual block may be performed in the same/similar manner in the encoding apparatus, and a redundant description will be omitted.

FIG. 6 is a diagram illustrating an embodiment of an APS syntax table to which an APS type for weight prediction is added.

According to an embodiment of the present disclosure, parameters for weight prediction may be signaled and parsed using APS. In addition, an APS type for transmitting a parameter for weight prediction may be defined, and may be mapped to one number from 0 to 2N−1. Here, N may be one of 2, 3, 4, and 5, and the embodiment shown in FIG. 6 corresponds to a case in which N is 3.

When the type of the corresponding APS is the parameter type for weight prediction, the step 600 of signaling or parsing the parameter for weight prediction may be added.

When the current APS type is WP_APS, a weight prediction-related parameter may be extracted by calling the pred_weight_table( ) function. The pred_weight_table( ) function may define only parameters related to unidirectional weight prediction or only parameters related to bidirectional weight prediction. Alternatively, the pred_weight_table( ) function may define parameters related to unidirectional and bidirectional weight prediction, respectively. The pred_weight_table( ) function may define at least one of a parameter related to implicit weight prediction or a parameter related to explicit weight prediction.

Meanwhile, the parameter extraction may be performed based on the above-described identifier 301. To this end, in the pred_weight_table( ) function, parameters related to weight prediction are defined for each identifier, and parameters related to weight prediction corresponding to the corresponding identifier 301 may be extracted. Alternatively, the parameter extraction may be performed without dependence on the identifier 301 described above.

FIG. 7 is a diagram illustrating another embodiment of an APS syntax table to which an APS type for weight prediction is added.

According to an embodiment of the present disclosure, parameters for weight prediction may be signaled and parsed using APS. Also, according to the direction of weight prediction, an APS type for transmitting a parameter for unidirectional weight prediction may be defined, and an APS type for transmitting a parameter for bidirectional weight prediction may be separately defined. In addition, the APS type for the unidirectional weight prediction and the APS type for the bidirectional weight prediction may be mapped to one number from 0 to 2N−1, respectively. Here, N may be one of 2, 3, 4, and 5, and the embodiment shown in FIG. 7 corresponds to a case in which N is 3.

When the type of the corresponding APS is one of the parameter types for weight prediction, the step 700 or 701 of signaling or parsing the parameter for weight prediction may be added.

A pred_weight_table( ) function for unidirectional weight prediction and a bipred_weight_table( ) function for bidirectional weight prediction may be defined, respectively.

When the current APS type is WP_APS, the pred_weight_table( ) function is called to extract the unidirectional weight prediction-related parameter, and when the current APS type is WBP_APS, the bipred_weight_table( ) function is called to extract the bidirectional weight prediction-related parameter. The parameter extraction may be performed based on the above-described identifier 301. To this end, pred_weight_table( ) and bipred_weight_table( ) may define the weight prediction-related parameter for each identifier, and the weight prediction-related parameter corresponding to the corresponding identifier 301 may be extracted. Alternatively, the parameter extraction may be performed without dependence on the identifier 301 described above.

FIG. 8 is a diagram illustrating another embodiment of an APS syntax table to which an APS type for weight prediction is added.

As shown in FIGS. 7 and 8, according to an embodiment of the present disclosure, parameters for weight prediction may be signaled and parsed using APS. In addition, according to the direction of weight prediction, an APS type for transmitting a parameter for unidirectional weight prediction may be defined, and an APS type for transmitting a parameter for bidirectional weight prediction may be separately defined. In addition, the APS type for the unidirectional weight prediction and the APS type for the bidirectional weight prediction may be mapped to one number from 0 to 2N−1, respectively. Here, N may be one of 2, 3, 4, and 5, and the embodiments shown in FIGS. 7 and 8 correspond to a case in which N is 3.

When the type of the corresponding APS is one of the parameter types for weight prediction, the step 800 or 801 of signaling or parsing the parameter for weight prediction may be added.

Additionally, in FIG. 8, the signaling or parsing step may be performed by using the APS type for unidirectional or bidirectional prediction as an input in the parameter signaling or parsing step for weight prediction. The pred_weight_table( ) function may define a parameter for unidirectional weight prediction and a parameter for bidirectional weight prediction, respectively. A parameter for weight prediction corresponding to the aforementioned APS type 302 may be extracted. Alternatively, a parameter for bidirectional weighted prediction may be derived from a parameter for unidirectional weighted prediction.

In addition, the parameter extraction may be performed in consideration of the above-described identifier 301. To this end, pred_weight_table( ) may define a weight prediction-related parameter for each identifier, and a weight prediction-related parameter corresponding to the corresponding identifier 301 may be extracted. Alternatively, the parameter extraction may be performed without dependence on the identifier 301 described above.

FIG. 9 is a diagram illustrating an embodiment of a syntax table for transmission and parsing a parameter for weight prediction.

As a diagram showing an embodiment of the additional steps 800 and 801 of signaling or parsing parameters for weight prediction shown in FIG. 8, aps_param_type corresponding to the APS type may be used as input in the step of signaling or parsing parameters for weight prediction.

In addition, when aps_param_type means bidirectional prediction according to the aps_param_type (901), an additional weighted prediction parameter signaling or parsing step 920 for bidirectional prediction may be added.

In addition, when weight prediction using APS is performed, the number of reference pictures (NumRefIdxActive), etc. may use a pre-defined fixed value or refer to parameters, etc. for the reference picture structure transmitted in advance.

FIG. 10 is a diagram illustrating an embodiment of an APS syntax table to which an APS type for a block division structure is added.

It is a diagram for illustrating an embodiment of a new APS type in addition to the APS syntax table shown in FIGS. 3 and 6. In FIG. 10, a parameter for a block division structure applicable to the above-described image unit may be signaled or parsed using APS, and may be signaled by defining an independent parameter type for the block division structure.

As mentioned above in describing the details of the invention with respect to FIGS. 3 and 6, aps_params_type 302, which is information on the APS type that specifies the type of parameters included in the APS, may be signaled.

As the APS type, an ALF APS type indicating a parameter for the ALF, an LMCS APS type indicating a parameter for an LMCS, etc. may be defined.

In addition to this, according to an embodiment of the present disclosure, an APS type for transmitting parameters for a block division structure may be defined, and parameter transmission and parsing for the APS type may be performed.

Also, according to an embodiment of the present disclosure, parameters included in the corresponding APS may be different depending on the APS type, and an additional parameter-related syntax parsing process for the corresponding APS type may be performed according to the APS type.

As shown in FIG. 10, when the current APS type is an APS type that transmits a parameter for the block division structure, the step 1001 of signaling or parsing the parameter for the block division structure may be additionally performed.

Also, according to an embodiment of the present disclosure, parameters for weight prediction may be signaled and parsed using APS. In addition, an APS type for transmitting a parameter for weight prediction may be defined, and may be mapped to one number from 0 to 2N−1. Here, N may be one of 2, 3, 4, and 5, and the embodiment shown in FIG. 10 corresponds to a case where N is 3.

FIGS. 11 and 12 show embodiments of a syntax table for parameters for a block structure additionally signaled or parsed when the current APS type is a parameter for a block division structure.

FIG. 11 shows an example of a syntax table in which a parameter for a block division structure applicable to an image unit is signaled in one parameter set together with parameters 1110 for a luma tree and parameters 1120 for a chroma tree when a specific condition is satisfied.

On the other hand, FIG. 12 show an embodiment of signaling information on one block division structure by using the syntax of slice_log 2_diff_max_bt_min_qt, slice_log 2_diff_max_tt_min_qt for a case where slice_log 2_diff_min_qt_min_cb, slice_max_mtt_hierachy_depth, and slice_max_mtt_hierachy_depth is not 0, regardless of the luma or chroma tree.

In the case of transmitting the block division structure using APS using FIG. 12, in signaling or parsing the block division structure in the slice header, etc., one or more APS IDs for parameters for the block division structure may be signaled or parsed according to at least one of the type of the current slice or whether the chroma separate tree (CST) technique is used. The embodiment is illustrated in FIG. 13.

FIG. 13 is a diagram illustrating a part of a syntax table for a slice header in order to show an embodiment of APS signaling or parsing for a block division structure in the slice header.

As described in the description of FIG. 12, when the block division structure is transmitted using the APS, one or more APS IDs for parameters for the block division structure may be signaled or parsed according to at least one of the type of the current slice or whether the chroma separate tree (CST) technique in signaling or parsing the block division structure in the slice header, etc.

As shown in FIG. 13, when CST is not applied, that is, when the luma tree and the chroma tree are used identically, the block division structure parameter corresponding to the APS ID parsed in slice_mtt_aps_id 1300 is applies equally to the luma tree and the chroma tree.

On the other hand, when CST is applied, that is, when the luma tree and the chroma tree are used differently, the block division structure parameter corresponding to the APS ID parsed in slice_mtt_aps_id 1300 is applied to the luma tree, and the block division structure parameter corresponding to the APS ID parsed in slice_mtt_chroma_aps_id 1310 is applied to the chroma tree.

FIG. 13 shows an embodiment in which the block division structure is transmitted in the slice header, but even when the block division structure is signaled or parsed in a sequence parameter set (SPS), a picture parameter set (PPS), etc., it may be signaled or parsed as in the example of the slice.

Figure 14:
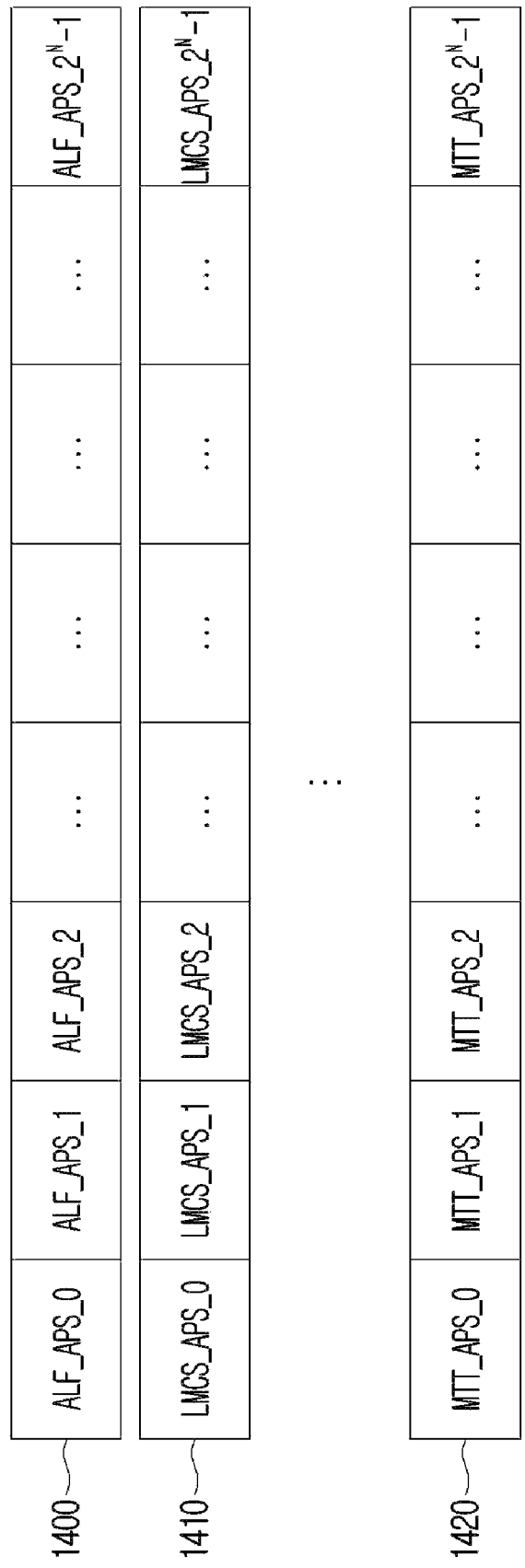
FIG. 14 is a diagram illustrating a concept of managing an APS using different lists according to APS types.

FIG. 14 is a diagram illustrating a concept of managing an APS using different lists according to APS types.

As described through the detailed description of FIG. 3, in the case of different adaptation parameter set types depending on the adaptation parameter set type 302, an adaptation parameter set identifier 301 may be defined by using a separate numeric string for each adaptation parameter set type.

In an embodiment, when the adaptation parameter set identifier 301 dependent on the adaptation parameter set type 302 is used, the adaptation parameter set identifier 301 for the ALF adaptation parameter set type may have any one value of 0 to 7. The adaptation parameter set identifier 301 for the LMCS adaptation parameter set type may have any one value of 0 to 3. The adaptation parameter set identifier 301 for the quantization adaptation parameter set type may have any one value of 0 to 7. In this case, parameter sets having different adaptation parameter set types 302 may use the same value. In an embodiment, the same value may be used for the adaptation parameter set identifier for the ALF (ALF_APS_ID) and the adaptation parameter set identifier for the LMCS (LMCS_APS_ID). Similarly, the same value may be used for the adaptation parameter set identifier for ALF (ALF_APS_ID) and the adaptation parameter set identifier for quantization (SCALING_APS_ID).

The same APS ID is allocated to different APS types, and different lists for each APS type may be used for management. Allocating the same APS_ID means that the interval of the identifier 301 value defined for each APS type may be the same or overlap with each other. That is, as in the above example, ALF_APS_ID and SCALING_APS_ID may have any one of 0 to 7, and LMCS_APS_ID may have any one of 0 to 3. In this case, the same APS_ID may be allocated even to different APS types. As shown in FIG. 14, for each APS type, a list for ALF_APS, a list for LMCS_APS, a list for SCALING_APS, etc. are defined/used, respectively, and one or more adaptation parameter sets having different identifiers (APS_ID) may be defined in each list. Here, the list may be interpreted as meaning a separate region or space.

Different APS_IDs may be allocated according to the APS type, and adaptation parameter sets may be managed using different lists. A different APS_ID may be allocated to each APS type and managed using one list. The same APS_ID may be allocated to different APS types, and the same list may be used to manage the APS types having the same APS_ID.

Various embodiments of the present disclosure are not listed as listing all possible combinations, but are intended to describe representative aspects of the present disclosure, and matters described in the various embodiments may be applied independently or may be applied in combination of two or more.

In addition, various embodiments of the present disclosure may be implemented by hardware, firmware, software, or a combination thereof. In the case of implementation by hardware, it can be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), general processors, controllers, microcontroller, microprocessor, etc.

The scope of the present disclosure includes software or machine-executable instructions (e.g., operating system, application, firmware, program, etc.) that allow an operation according to a method of various embodiments to be executed on a device or a computer, and a non-transitory computer-readable medium in which the software or instructions are stored and executed on a device or a computer.

INDUSTRIAL AVAILABILITY

The present disclosure may be used to encode/decode an image signal.

The invention claimed is:

1. A method of decoding an image signal including a current picture with a decoding apparatus, comprising:
    obtaining, with the decoding apparatus, coefficients of a current block in the current picture from a bitstream;
    decoding, with the decoding apparatus, a residual block of the current block by performing inverse-quantization on the coefficients based on a quantization-related parameter from the bitstream; and
    reconstructing, with the decoding apparatus, the current block based on the decoded residual block,
    wherein the quantization-related parameter is obtained from an adaptation parameter set (APS) included in the bitstream,
    wherein the adaptation parameter set includes at least one of parameter type information indicating a parameter type carried in the adaptation parameter set among a plurality of parameter types pre-defined in the decoding apparatus or identification information for identifying one of a plurality of parameter candidates defined for each of the parameter types,
    wherein the plurality of parameter types include an ALF (adaptive loop filter)-related parameter, a LMCS (luma mapping with chroma scaling)-related parameter, and the quantization-related parameter,
    wherein, a value of the identification information is in a range of 0 to $2^N-1$ when the parameter type information indicates the ALF-related parameter or the quantization-related parameter, while a value of the identification information is in a range of 0 to $2^M-1$ when the parameter type information indicates the LMCS-related parameter, and
    wherein a value of N is different from a value of M.

2. The method of claim 1, wherein the value of N is greater than the value of M.

3. The method of claim 2, wherein the plurality of parameter types use a space separated from each other for the identification information.

4. The method of claim 3, wherein one or more parameter candidates with different identification information are defined in the space for each of the parameter types.

5. The method of claim 1, wherein decoding the residual block of the current block comprises:
   obtaining, with the decoding apparatus, a scaling list for the inverse-quantization based on the quantization-related parameter;
   deriving, with the decoding apparatus, a scaling factor based on the scaling list and a predetermined weight; and
   applying, with the decoding apparatus, the derived scaling factor to the coefficients of the current block.

6. The method of claim 5, wherein the weight is obtained from one of weight candidate lists pre-defined in the decoding apparatus.

7. The method of claim 6, wherein a first list of the weight candidate lists is representative of {40, 45, 51, 57, 64, 72} and a second list of the weight candidate lists is representative of {57, 64, 72, 80, 90, 102}.

8. The method of claim 7, wherein in response to a case where the current block is a block encoded in a transform skip mode, the weight is obtained from the first list, and
   wherein in response to a case where the current block is not the block encoded in the transform skip mode, the weight is obtained from the second list.

9. A method of encoding an image signal including a current picture with an encoding apparatus, comprising:
   obtaining, with the encoding apparatus, quantized coefficients of a current block in the current picture from a residual signal of the current block; and
   generating, with the encoding apparatus, a bitstream by encoding the quantized coefficients of the current block,
   wherein the quantized coefficients are obtained by performing quantization based on a quantization-related parameter,
   wherein the quantization-related parameter is encoded in an adaptation parameter set (APS) included in the bitstream,
   wherein the adaptation parameter set includes at least one of parameter type information indicating a parameter type carried in the adaptation parameter set among a plurality of parameter types pre-defined in the encoding apparatus or identification information for identifying one of a plurality of parameter candidates defined for each of the parameter types,
   wherein the plurality of parameter types include an ALF (adaptive loop filter)-related parameter, a LMCS (luma mapping with chroma scaling)-related parameter, and the quantization-related parameter,
   wherein, a value of the identification information is in a range of 0 to $2^N-1$ when the parameter type information indicates the ALF-related parameter or the quantization-related parameter, while a value of the identification information is in a range of 0 to $2^M-1$ when the parameter type information indicates the LMCS-related parameter, and
   wherein a value of N is different from a value of M.

10. A non-transitory computer-readable medium for storing data associated with an image signal including a current picture, comprising:
    a bitstream including a quantization-related parameter for inverse-quantization of coefficients of a current block in the current picture,
    wherein the quantization-related parameter is obtained from an adaptation parameter set (APS) included in the bitstream,
    wherein the adaptation parameter set includes at least one of parameter type information indicating a parameter type carried in the adaptation parameter set among a plurality of parameter types pre-defined in a decoding apparatus or identification information for identifying one of a plurality of parameter candidates defined for each of the parameter types,
    wherein the plurality of parameter types include an ALF (adaptive loop filter)-related parameter, a LMCS (luma mapping with chroma scaling)-related parameter, and the quantization-related parameter,
    wherein, a value of the identification information is in a range of 0 to $2^N-1$ when the parameter type information indicates the ALF-related parameter or the quantization-related parameter, while a value of the identification information is in a range of 0 to $2^M-1$ when the parameter type information indicates the LMCS-related parameter, and
    wherein a value of N is different from a value of M.

* * * * *